Figure 1:
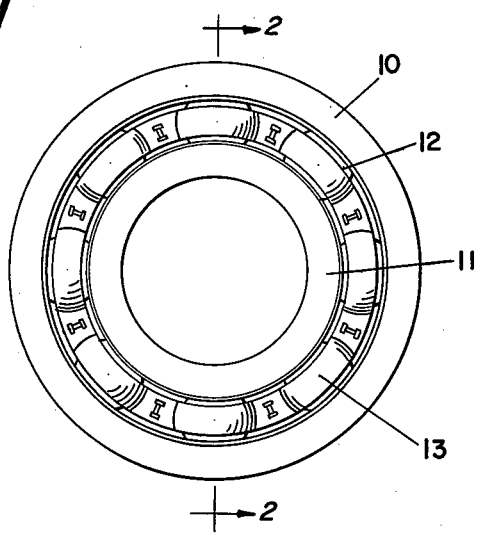

Feb. 26, 1963   E. R. LAMSON ET AL   3,079,204
LUBRICATED BEARINGS
Original Filed July 8, 1958

3,079,204
LUBRICATED BEARINGS
Edward R. Lamson, Greentree Road, R.D. 4, Sewell, N.J., and Martin J. Devine, 2560 Prescott Road, Havertown, Pa.
Continuation of application Ser. No. 747,320, July 8, 1958. This application Aug. 16, 1960, Ser. No. 50,046
5 Claims. (Cl. 308—187)
(Granted under Title 35, U.S. Code (1952), sec. 266)

The invention described herein may be manufactured and used by or for the Government for governmental purposes without the payment of any royalty thereon.

This application is a continuation of Serial No. 747,320 filed July 8, 1958, now abandoned.

The present invention is directed to improvements in bonded film compositions whereby inorganic binders are employed to hold solid lubricants on a surface to be lubricated. The lubricant film so formed is able to withstand and to operate successfully at temperatures both higher and lower than those at which current organic binders fail to operate.

The primary object of this invention is to provide a lubricant which will retain its lubricating properties over a temperature range of −296° F. up to as high as 750° F.

Another object of this invention is to provide a lubricant which will be useful in an atmosphere consisting entirely of oxygen. The danger of explosion is eliminated because of the absence of readily oxidizable material.

Yet another object is to provide a lubricant having a very high nuclear radiation resistance potential.

Other and further objects and advantages residing in the specific combination of materials and achieving their combination will be made apparent in the following specification and claims.

A problem to keep bearings properly lubricated over extreme temperature ranges has been long outstanding.

Greases have proven to be unsatisfactory because at temperatures of 750° F. they become very fluid, and loose their lubricating facilities because of evaporation or thermal decomposition. At temperatures of −296° F. the greases become stiff and unworkable. Our invention overcomes all of these disadvantages.

The drawing illustrates an antifriction bearing of the ball bearing type and reference thereto will facilitate an understanding of the invention as hereinafter set forth.

Figure 2:
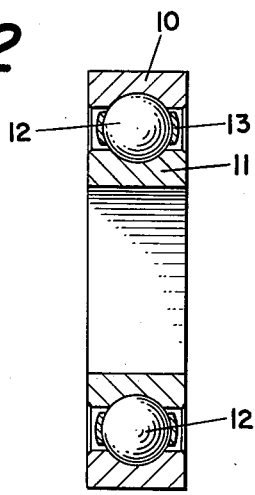

FIG. 1 is a side view of such a bearing; and
FIG. 2 is a sectional view taken on the line 2—2 of FIG. 1.

Referring to the drawings, FIG. 1 shows an antifriction bearing of the ball bearing type having an outer race 10 and an inner race 11 with a plurality of ball bearings 12 interposed therebetween. A conventional retainer 13 maintains the ball bearings in uniform spacing.

We have found that if a solid lubricant material such as molybdenum disulfide be dispersed in a metallic silicate solution and the resulting mixture applied to antifriction bearings such as to form a film on their surfaces, this film has the completely unexpected property of providing a lubricant for the bearings making them capable of operating over a wide temperature range without loss of lubricant and with a substantially constant operating torque.

Solid lubricants are well known to the art. They have been used in bonded films with an organic resin as the bonding agent. The instant invention is an improvement on these bonded film lubricants. An inorganic sodium or potassium silicate solution is employed as the bonding agent. It was formerly thought that these silicates would be inapplicable for use as a bonding medium in bonded films. The feeling in the prior art was that these silicates would not make good lubricating bonded films. However, the bonded film compositions of the present invention are able to withstand much greater temperatures than those made with organic binders.

The silicate solutions used in the practice of this invention have the following compositions:

| Solution Designation | Percent $Na_2O$ by weight | Percent $SiO_2$ by weight | Degrees Baumé at 68° F. | Viscosity Centipoises at 68° F. |
|---|---|---|---|---|
| Sodium Silicate Solution K | 11.00 | 31.90 | 47.0 | 960 |
| Sodium Silicate Solution N | 8.90 | 28.70 | 41.0 | 180 |

| Solution Designation | Percent $K_2O$ by weight | Percent $SiO_2$ by weight | Degrees Baumé at 68° F. | Viscosity Centipoises at 68° F. |
|---|---|---|---|---|
| Potassium Silicate Solution— KASIL #1 | 7.80 | 19.50 | 28.0 | 40 |
| Potassium Silicate Solution—KASIL #6 | 12.60 | 26.45 | 40.4 | 1,140 |

The preferred method of mixing powdered solid lubricants from the group consisting of molybdenum disulfide and graphite with the metallic silicate solution is to first wet the powdered solid lubricant with water, the resulting slurry is added to the metallic silicate solution and stirred to obtain a uniform mixture.

The following examples describe specific embodiments of the invention, but are not to be construed as limiting the scope thereof. All parts given are by weight.

*Example I*

Molybdenum disulfide powder (thirty to sixty-five parts by weight) was dispersed in sodium silicate solution K (thirty-five to seventy parts by weight being sufficient to bring the resulting concentration to 100 parts) by first wetting the solid lubricant with water (e.g. 80 cc. of water/77 g. of solid lubricant) and adding the resulting slurry to the sodium silicate solution K and stirring to obtain a uniform sprayable mixture.

The retainers of a clean unassembled ball bearing were phosphated (thermoil-granodine process) and then coated four times with the above described lubricant formulation. The total coating thickness is approximately 0.0003 to 0.0005 inch; however, this thickness can be varied dependent on the operating clearances of the part lubricated. In addition, two coats of the lubricant formulation were applied to the raceways (no surface pre-treatment)—the coated components were air-dried for approximately one hour; cured at 180° F. for approximately twenty-four hours followed by curing at 300° F. for twenty-four hours. The bearing was removed from the oven and allowed to return to room temperature. The bearing was then reassembled, then pre-rotated for one minute to remove any loose adhering film particle. The bearing was then washed several times in petroleum ether and dried at 212° F. After cooling, the bearing was placed on a performance test spindle and rotated at 10,000 revolutions per minute at room temperature. Test results were that the running time to failure was five hours.

*Example II*

Using the procedure of Example I, a bonded film was made consisting of 55 parts by weight of molybdenum disulfide, 6 parts by weight of graphite, and 39 parts by weight of sodium silicate solution K.

This film when used on bearings which were rotated at 1250 revolutions per minute at 350° F. gave a test result of 240 hours running time before the bearings failed. When the bearings were rotated at 10,000 revolutions per minute, the running time to failure was 29 hours.

*Example III*

A bonded film consisting of 55 parts by weight of molybdenum disulfide, 6 parts by weight of graphite, 1 part by weight of zinc oxide, and 38 parts by weight of sodium silicate solution K.

The zinc oxide was added to increase the water stability of the film. It was also found that magnesium and titanium oxide performed this function without destroying the other properties of the composition.

All of the above discussed examples exhibited high thermal stability. To demonstrate their thermal stability, steel panels were coated with the formulations and cured as previously specified. They were then placed in an oven for twenty-four hours at 400, 500, 600, 700 and 800° F. They were then removed and the film showed on examination no loss of adhesion, cracking or other signs of deterioration. The twenty-four hour cycle was continued at 900° F. After twenty-four hours at 900° F., an examination revealed an $MoO_3$ formation on approximately 20% of the panel.

In summary, the advantages of the present invention may be realized by providing on the bearing surfaces of relatively movable parts a thin, dry film which includes as its principal lubricating agent a solid comminuted lubricant consisting of molybdenum disulfide uniformly dispersed in a dried, water-soluble, metallic silicate, the molybdenum disulfide being present in the range from at least 30% and not more than 70% by weight. In the preferred form of the invention, the dried film includes graphite which may range upwardly to about six parts by weight and if desired, there may be included in small quantity (about one part by weight) of zinc oxide for the purpose of increasing the water stability (decreasing the water solubility) of the film. In the foregoing, the weights are set forth in terms of the total weight of the mixture including the silicate solutions, it being understood that in the drying of the silicate solutions, the relative weight percentages will correspondingly change. For example, in the above tables for their silicate solutions, the weight percentages of the solids in each solution may be added together to obtain the weight percentages for the total solids in each metallic silicate. If this be done, it will be known at once that Solution K has a total weight percentage of solids of 42.9 and Solution N 37.6%; Kasil No. 1: 27.3%, and Kasil No. 6: 39.05%. With the weight percentages of total solids, all ingredients can be reduced to corresponding dry weight percents. Thus, in Example I, the molybdenum disulfide ranges from 30 parts to 65 parts, with the silicate Solution K ranging from 35 to 70 parts. Accordingly, if the silicate solution of 70 parts has 42.9% solids, there will be present in the solution of 70 parts, the product of the two, or 30 parts of silicate solids. Similarly, if the 35 parts of silicate solution be taken as Kasil No. 1, the product of 35 parts times 27.3% will be 9.6 parts. Since the ranges provided in Example I have now been converted to a dry weight basis, there may be computed the percentages on that basis. Thus, for 30 parts of molybdenum disulfide, and with the silicate solids of 30 parts, each will be present in amounts 50% by weight. Similarly, if the molybdenum disulfide be present on a dry weight basis of 65 parts with silicate solids 9.6 parts, the molybdenum disulfide will comprise 87% by weight of the mixture and with 13% of silicate solids. By bringing all ingredients to the same dry weight percentage basis, there is less ambiguity in the ranges of ingredients embodying the present invention.

Applying the foregoing transformation from a parts-by-weight basis of Example II to a dry-weight basis in terms of percentage, it will be seen at once that Example II provides 55 parts by weight of molybdenum disulfide and 6 parts by weight of graphite, a total of 61 parts. The sodium silicate Solution K is made up of 11% of sodium oxide and 31.9% of silicon dioxide, or a total of 42.9%. Accordingly, on a dry-weight basis, there will be present sodium silicate representing the product of 42.9% times .39 or 16.73 parts. Thus, for Example II, there will be a total of 77.73 parts on a percentage basis. The molybdenum disulfide will be 71%, the graphite 7.7% and the sodium silicate 21.3%.

What is claimed is:

1. The combination with relatively movable parts having bearing structure requiring lubrication, of a thin, dry lubricating film comprising a composition bonded to said bearing structure, the bonding agent for said film consisting of a dried water soluble metallic silicate, and a lubricating agent for said bearing structure consisting of a mixture of molybdenum disulfide and graphite uniformly dispersed throughout said film, said molybdenum disulfide being present in materially greater amount than said graphite.

2. The combination with relatively movable parts having bearing structure requiring lubrication, of a thin, dry lubricating film comprising a composition bonded to said bearing structure, a bonding agent for said film consisting of a dried water soluble metallic silicate, said film for said bearing structure including as its principal lubricating agent molybdenum disulfide uniformly dispersed throughout said film, said lubricating film on a dry-weight basis consisting of said molybdenum disulfide from at least 50% to not more than 87% and of said metallic silicate from 50% to 13%.

3. The combination with an anti-friction bearing including a plurality of rolling elements movable relative to associated bearing structure, of a lubricating composition in the form of a thin, dry film bonded to said rolling elements and to said associated bearing structure, said film including as its principal lubricating agent a solid comminuted lubricant consisting of molybdenum disulfide uniformly dispersed in a dried water soluble metallic silicate, said molybdenum disulfide on a dry-weight basis being present in the range of from 50% to 87% and said metallic silicate on a dry-weight basis being present in amount ranging from 50% to 13%.

4. A bonded film lubricating composition for bearing structure consisting on a dry-weight basis of a mixture of at least 50% and not more than 87% of molybdenum disulfide as its principal lubricating ingredient, graphite ranging from zero to 7.7% and from 50% to 13% of a water soluble metallic silicate in water in amount sufficient to form a water solution of said metallic silicate and also in amount sufficient to form a uniform mixture which upon application to said bearing structure develops thereon after evaporation of said water, solely by means of said silicate as the bonding agent, a thin, dry, lubricating film bonded thereto.

5. A bonded film lubricating composition for bearing structure on a dry-weight basis comprising a mixture of at least 50% and not more than 87% of molybdenum disulfide as its principal lubricating ingredient and from 50% to 13% of a water soluble metallic silicate in water in amount sufficient to provide a water solution of said metallic silicate and also sufficient to form a uniform mixture which upon application to said bearing structure develops thereon after evaporation of said water, solely by means of said silicate as the bonding agent, a thin, dry, lubricating film bonded thereto.

References Cited in the file of this patent

UNITED STATES PATENTS

| | | |
|---|---|---|
| 573,120 | Wheeler | Dec. 15, 1896 |
| 2,316,778 | Fiechter | Apr. 20, 1943 |
| 2,466,642 | Larsen | Apr. 5, 1949 |
| 2,754,168 | Atlee | July 10, 1956 |
| 2,901,380 | Crump | Aug. 25, 1959 |

OTHER REFERENCES

"A List of Dag Dispersions for Industry," Acheson Colloids Co., Port Huron, Michigan. Fourth Revision, October 1955, 4 pp.